US011435212B2

(12) United States Patent
Vaissiere

(10) Patent No.: US 11,435,212 B2
(45) Date of Patent: Sep. 6, 2022

(54) METHOD OF OPERATING AND OF PREDICTIVE MONITORING OF A FIELD DEVICE

(71) Applicant: Endress+Hauser Group Services AG, Reinach (CH)

(72) Inventor: Dimitri Vaissiere, Rixheim (FR)

(73) Assignee: ENDRESS+HAUSER GROUP SERVICES AG, Reinach (CH)

( * ) Notice: Subject to any disclaimer, the term of this patent is extended or adjusted under 35 U.S.C. 154(b) by 341 days.

(21) Appl. No.: 16/875,678

(22) Filed: May 15, 2020

(65) Prior Publication Data

US 2020/0363245 A1 Nov. 19, 2020

(30) Foreign Application Priority Data

May 15, 2019 (DE) ...................... 10 2019 112 745.9

(51) Int. Cl.
*G01F 1/66* (2022.01)
*G01K 13/00* (2021.01)
(Continued)

(52) U.S. Cl.
CPC .............. *G01F 1/662* (2013.01); *G01F 25/10* (2022.01); *G01K 13/00* (2013.01); *G01K 15/005* (2013.01);
(Continued)

(58) Field of Classification Search
CPC ......... G01F 1/662; G01F 25/10; G01K 13/00; G01K 15/005; G01N 27/4163;
(Continued)

(56) References Cited

U.S. PATENT DOCUMENTS

2005/0107983 A1 5/2005 Bode
2009/0070069 A1 3/2009 Bouse et al.
(Continued)

FOREIGN PATENT DOCUMENTS

CN 101346618 A 1/2009
CN 102901529 A 1/2013
(Continued)

OTHER PUBLICATIONS

Translation of EP-2602680-A1 (provided by Applicant) (Year: 2013).*

(Continued)

*Primary Examiner* — Nathaniel T Woodward
(74) *Attorney, Agent, or Firm* — Kelly J. Smith; Endress+Hauser (USA) Holding Inc.

(57) ABSTRACT

A method for monitoring a measurement variable and performing predictive monitoring of a compliancy of a characteristic of a field device to a requirement is described. The method includes a step of determining a deviation between a measured value of a monitored variable and a reference value of the monitored variable. The deviation is indicative of a degree of compliancy to the requirement. The method also includes a step of applying a filter to the deviations based on the deviations and the filtered deviations. The method further includes a step of determining a noise superimposed on the filtered deviations. At the end of a monitoring interval, a time remaining until the deviations will exceed the deviation range is determined using a Monte Carlo simulation.

14 Claims, 4 Drawing Sheets

(51) Int. Cl.
*G01K 15/00* (2006.01)
*G01N 27/416* (2006.01)
*G01F 25/10* (2022.01)

(52) U.S. Cl.
CPC ..... *G01N 27/4163* (2013.01); *G01N 27/4167* (2013.01)

(58) Field of Classification Search
CPC ............ G01N 27/4167; G05B 23/0283; G05B 19/042; G01D 1/14; G01D 1/18; G01D 3/08; G07C 3/146
USPC .......................................................... 702/48
See application file for complete search history.

(56) References Cited

U.S. PATENT DOCUMENTS

2012/0191384 A1* 7/2012 Kalgren ................. G01D 18/00
702/58
2013/0030746 A1* 1/2013 Vaissiere ................ G01F 25/00
702/88

FOREIGN PATENT DOCUMENTS

| CN | 103999003 A | 8/2014 | | |
|---|---|---|---|---|
| CN | 107111312 A | 8/2017 | | |
| DE | 102014118845 A1 | * | 6/2016 | |
| DE | 102014118845 A1 | | 6/2016 | |
| DE | 102017116167 A1 | | 1/2019 | |
| EP | 2602680 A1 | * | 6/2013 | ............. G01D 18/00 |
| EP | 2602680 A1 | | 6/2013 | |
| EP | 2602680 B1 | | 6/2014 | |

OTHER PUBLICATIONS

Translation of DE-102014118845-A1 (provided by Applicant) (Year: 2016).*

* cited by examiner

METHOD OF OPERATING AND OF PREDICTIVE MONITORING OF A FIELD DEVICE

CROSS-REFERENCE TO RELATED APPLICATION

The present application is related to and claims the priority benefit of German Patent Application No. 10 2019 112 745.9, filed on May 15, 2019, the entire contents of which are incorporated herein by reference.

TECHNICAL FIELD

The present disclosure concerns a method of operating a field device for measuring and/or monitoring at least one measurement variable at an operating site and of predictive monitoring of a compliancy of at least one characteristic of said field device to a requirement specified for said field device.

BACKGROUND

Field devices for measuring and/or monitoring at least one measurement variable are operated at operating sites in nearly all branches of industry.

There is a wide range of field devices, e.g. measurement devices, sensors, measurement probes etc., of different types and capabilities on the market. These field devices are commonly used to measure and/or monitor measurement variables, such as e.g. physical quantities related to ongoing production processes or properties of a medium or product. Field device are e.g. applied to measure and/or monitor a level of a product in a container, a flow of a medium flowing through a pipe, a temperature of a gas, a liquid or an object, a pressure of a medium, a pH-value of a medium or a concentration of an analyte comprised in a fluid.

Measurement results provided by these field devices are commonly used in process automation for monitoring, controlling and/or regulating industrial processes, e.g. production processes. Thus field devices play a vital part in industry and non-compliancy of a characteristic of a field device to a requirement specified for the device may have severe consequences, ranging from impaired production processes, the production of faulty products to potential hazards to people and/or the environment.

In order to ensure, that field devices fulfill requirements specified for them, like e.g. a specified measurement accuracy or other performance related requirements, field devices are subjected to regularly performed service actions such as calibrations and/or maintenance procedures.

Calibrations are usually performed on specially designed calibration sites capable of providing one or more different predefined values of the measurement variable with very high accuracy. A typical calibration procedure foresees determining at least one measurement error of the field device based a measured value of the measurement variable determined by the field device and a corresponding reference value provided by means foreseen at the calibration site. In case the measurement errors exceed a maximum permissible error, the device is considered not to conform. As a consequence, adjustment, repair or replacement of the measurement device is required. Required adjustments are usually performed based on the data obtained during the calibration procedure. They include for example adjustments of offset, gain and/or span of the measurement indication. If the measurement errors do not exceed the maximum permissible error conformity of the field device is declared and generally no further actions are taken.

Maintenance procedures are usually performed by specially trained service technicians and may include visual inspections, replacements of parts subjected to wear and/or tear, as well as special tests or inspections of individual components of the field device.

With respect to any service action the field device is subjected to on a regular basis, there is a need in industry, to optimize the time intervals between consecutive service actions. On one hand, the time intervals should be as long as possible in order to reduce the time, costs and efforts involved in their performance. On the other hand, the time intervals need to be as short as necessary in order to ensure safe and faultless operation of the field device in between consecutive service actions.

In this respect, EP 2 602 680 B 1 describes a method of determining an optimized next calibration time, at which a specific field device requires re-calibration. According to this method the next calibration time is determined as a time which is earlier or equal to a time, at which a measurement error of the device will exceed a predetermined maximum permissible error. This time is determined based on a Monte Carlo simulation performed based on the measurement errors of the field device determined during at least two previously performed calibrations and probability density functions for determining a measurement error in the respective calibration solely due to an uncertainty inherent to the respective calibration. This method does however require for the uncertainty inherent to the calibrations to be determined. This requires additional information, which may not be available.

In general, the optimal lengths of time intervals in between consecutive service actions performed on a specific field device depends on the time scale on which the performance and/or the measurement error of the field device can be expected to change. This time scale not only depends on the long term stability of the performance of the field device, but also on other influences or conditions, such as e.g. environmental conditions, the device may be exposed to prior to the next service action, which may not always be predictable.

To further reduce the risk involved in operating field devices the performance of individual field devices can be monitored during operation. To this extent, field devices can be equipped with means allowing for the performance of the field device or of individual components of the field device to be monitored during operation. Examples are field devices comprising means for performing a self-diagnosis. Another example are field devices offered by the Endress+Hauser Group comprising a Heartbeat function, enabling the field device to monitor its performance. Also monitoring can be performed by performing on-site calibrations or verifications during operation of the field device.

Monitoring methods of this kind are usually performed based on a comparison between a measured value of a predefined variable determined by the field device and a corresponding reference value, wherein a deviation between the two is indicative of the a degree of compliancy of the field device to a requirement specified for the device. Thus, compliancy of the field device can be determined each time the deviation can be determined. In consequence, the capabilities of these methods are limited by the frequency or rate of availability of the measured value and the reference value. In addition, once a field device is found not to be compliant to the requirement, it is too late to prevent this from happening. To make preemptive measures preventing the operation of non-compliant devices possible, it would be necessary to know in advance, at which point in time in the future a presently compliant field device will become non-compliant.

In this respect the European Patent Application No.: 18214501 filed on Dec. 20, 2018 by the applicant: Endress+ Hauser Consult AG, Reinach, Switzerland, describes a method of determining a remaining time interval until a measurement characteristic, e.g. a measurement error, of a field device will have drifted outside a predetermined tolerance range. This method comprises the steps of a) continuously registering the measurement characteristic, b) estimating a lag time interval, wherein the estimated lag time depends on the drift of the measurement characteristic in the process specific application, and d) at the end of the lag time interval determining the remaining time interval by using a method of artificial intelligence or a Monte Carlo simulation.

SUMMARY

It is an object of the present disclosure to provide an improved method of predictive monitoring of a field device operating at an operation site. In particular, it is an object of the present disclosure to improve the determination of a remaining time remaining until a monitored characteristic of the field device will become non-compliant to a specified requirement in applications, wherein an uncertainty inherent to the determination of the characteristic is unknown, wherein the time dependency of the characteristic may change in an unpredictable manner during operation of the field device, and/or wherein the time differences between consecutively determinable characteristics may vary significantly and/or in an unpredictable manner.

To this extent, the present disclosure comprises a method of operating a field device for measuring and/or monitoring at least one measurement variable at an operating site and of predictive monitoring of a compliancy of at least one characteristic of said field device to a requirement specified for said field device comprising the steps of:

continuously monitoring said characteristic by: at consecutive times determining a deviation between a measured value of a monitored variable determined by said field device and a reference value of said monitored variable, wherein said deviations are indicative of a degree of compliancy to said requirement, recording said deviations, applying a filter to the recorded deviations, based on the deviations and the filtered deviations determining a noise superimposed on the filtered deviations, at the end of at least one monitoring time interval, during which three or more deviations have been recorded and wherein none of these deviations exceeded a deviation range defined for the deviations based on the requirement, determining a remaining time remaining until the deviations will exceed said deviation range, by: for at least two different deviation pairs, each comprising a first and a second deviation determined based on the filtered deviations comprised in the monitoring time interval, determining a simulated value of the remaining time by performing a Monte Carlo simulation based on the noise and the respective deviation pair, based on the simulated values determining the remaining time, and generating an output informing about the remaining time.

It is an advantage of the method, that each simulated value accounts for an average rate of change of the deviations, that occurred in a time interval elapsed in-between the first and the second deviation of the respective deviation pair. Since each deviation pair is different, each simulated value accounts for the average rate of change of the deviations in a different time interval. Thus, in combination the simulated values truly account for the time dependency of the deviations in all time intervals covered by the deviation pairs, even if the time dependency changed during the monitoring time interval.

Another advantage is, that the method neither requires for the deviations to be available at a fixed rate, nor for the deviations to be available at previously known points in time.

In addition, performing each of the simulations based on the previously determined noise ensures, that the uncertainty inherent to the determination of the deviations is accounted for. Since the noise is determined based on the recorded and the filtered deviations, no additional knowledge about the uncertainty inherent to the determination of the measured values and the corresponding reference values is required.

A first refinement comprises a method according to the present disclosure, wherein:

the first deviation of each deviation pair is given by one of the filtered deviations comprised in the monitoring time interval, and the second deviation of each pair is either given by another filtered deviation comprised in the monitoring time interval or given by a predicted deviation forecasted for a time after the end of the monitoring time interval based on the filtered deviations comprised in the monitoring time interval.

A refinement of the first refinement comprises a method, wherein:

each predicted deviation is forecasted for the corresponding time exceeding an end of the monitoring interval by less than a fraction of the length of the monitoring time interval, by less than one fifth of the length of the monitoring time interval or by less than one tenth of the length of the monitoring time interval, and/or each predicted deviation is determined based on the filtered deviations comprised in the monitoring time interval by a method of time series forecasting, by applying machine learning or deep learning, or by applying a neural network.

A refinement of the first refinement or the refinement of the first refinement comprises a method, wherein at least one determination of the remaining time is performed based on simulated values of the remaining time determined for a set of different deviation pairs, wherein said set of different deviation pairs:

a) is selected such, that the second deviation of each deviation pair is given by the last filtered deviation or one of the last filtered deviations comprised in the monitoring time interval, or b) is selected such, that the second deviation of each deviation pair is given by one of the predicted deviations or the same predicted deviation.

A refinement of the last mentioned refinement comprises a method, wherein a time difference between the times corresponding to the first and the second deviation of each of the deviation pairs comprised in the set is larger or equal to a predetermined minimal time difference.

A refinement at least of one of: the first refinement and at least one refinement of the first refinement comprises a method, wherein at least one determination of the remaining time is performed based on simulated values of the remaining time determined for a set of different deviation pairs, wherein said set of different deviation pairs is selected such, that:

the first deviation of the first deviation pair of the set is located at or near the beginning of the monitoring time interval, starting with the second deviation pair of the set, the first deviation of each deviation pair is selected such, that the corresponding time is larger than the corresponding time of the first deviation of the previous deviation pair and the second deviation of each deviation pair is selected such, that the corresponding time is larger than the corresponding time of the second deviation of the previous deviation pair, and a section of the monitoring time interval enclosed between the times corresponding to the first and the second deviation of each pair comprises two or more recorded deviations.

A second refinement of the method according to the present disclosure comprises a method, wherein:

said filter applied to determine the filtered deviations is capable of separating a signal comprised in the recorded deviations from a noise superimposed on this signal, each remaining time is determined as a remaining time interval given by the amount of time remaining until the deviations will exceed the deviation range and/or as a point in time at which the deviations will exceed the deviation range, each remaining time is determined as an average or a weighted average of the simulated values of the remaining time determined for each of the deviations pairs, said monitored variable is:

a) one of the at least one measured variables measured and/or monitored by said field device, b) a predefined variable determined by monitoring, diagnosing, verification or calibration means comprised in the field device, or c) is determined by the field device based on one or several input variables determined or provided by the field device and/or based on one or more input parameters determined or provided by the field device, and/or said reference values are:

a) provided by the field device, by monitoring, diagnosing, verification or calibration means comprised in the field device, or by another device, and/or b) given by target values stored in the field device or measured or determined by means comprised in the field device.

A third refinement of the method comprises a method, wherein:

at least one remaining time is determined as a weighted average of the simulated values of the remaining time determined for each of the deviations pairs, wherein each weighing factor applied to determine the weighted average is determined based on the times corresponding to the first and the second deviation of the respective deviation pair, or at least one remaining time is determined based on the formula:

$$RT = \frac{\sum_{k=1}^{L} (t2_k - t1_k) * SRT_k}{\sum_{k=1}^{L} (t2_k - t1_k)}$$

wherein RT denominates the remaining time, k denominates the respective pair, and $t1k$ and $t2k$ denominate the times corresponding to the first and the second deviation of the respective pair.

A fourth refinement of the method comprises a method, wherein said noise:

a) is determined based on the deviations recorded during a preliminary time interval preceding the first determination of the remaining time and the corresponding filtered deviations, wherein at least ten or at least thirty deviations have been recorded during said preliminary time interval, b) is determined or re-determined based on the deviations recorded during one of the at least one monitoring time intervals and the corresponding filtered deviations at least once or at the end of each monitoring time interval, wherein at least ten or at least thirty deviations have been recorded during each of said monitoring time intervals, c) is determined as probability distribution representing the noise, and/or d) is determined as probability distribution, wherein said probability distribution is either determined based on or as a frequency distribution of the differences between the recorded deviations and the corresponding filtered deviations or by fitting at least one parameter of a distribution of a given type to a corresponding property of the noise determined based on the recorded deviations and the corresponding filtered deviations.

A refinement of the fourth refinement comprises at least one of the steps of:

at least once re-determining the noise based on more recently recorded deviations and the corresponding filtered deviations, based on deviations recorded after the most recent determination of the noise performing a test testing whether the noise has changed significantly since it has last been determined and re-determining the noise in case a significant change of the noise has been determined based on the tests, and/or continuously updating the noise based on the deviations recorded after the determination of the noise.

A fifth refinement comprises the steps of:

monitoring, whether any of the determined deviations exceed the deviation range, and generating an alarm when at least one of the recorded deviations exceeded the deviation range and/or performing a service action on the field device when at least one of the recorded deviations exceeded the deviation range.

A sixth refinement further comprises at least one of the steps of:

a) based on at least one determined remaining time scheduling at least one service action to be performed on the field device, b) performing at least one service action on the field device before a point in time, at which the deviations will exceed the deviation range according to the last determined remaining time, c) following the performance of a service action on the field device resuming the method by determining at least one more remaining time based on the previously determined noise or by restarting the method from the beginning, d) following the determination of at least one remaining time determining at least one more remaining time before the point in time at which the deviations will exceed the deviation range according to the previously determined remaining time, and e) updating the output informing about the remaining time every time a new remaining time has been determined.

A seventh refinement of the method comprises a method, wherein:

the monitoring time intervals comprise consecutive intervals, overlapping time intervals, at least one interval of a fixed length and/or at least one interval of an individually determined length, at least one monitoring time interval is determined by determining the end of this monitoring time interval to be equal to a time at which a predefined number of deviations larger or equal to three has been recorded after a beginning of this monitoring time interval, and/or the length of at least one monitoring time interval is determined as a fixed length longer than a time required for at least three consecutive deviations to be recorded and of the same order of magnitude as a timescale on which the deviations may exceed the deviation range.

The present disclosure further comprises a system for performing the method according to the present disclosure, comprising a) said field device for measuring and/or monitoring at least one measurement variable comprising means for determining the measured values of the monitored variable, b) means providing the reference values of the monitored variable, c) data transfer means providing the recorded deviations or measured values and the reference values to computing means comprised in the system and designed to perform a computer program implemented on said computing means causing the computing means to perform the determination of the noise and of the at least one remaining time, and d) output means providing the output generated by the performance of the method.

The present disclosure further comprises refinement of the system, wherein:

said means for determining the measured values of the monitored variable are means for determining one of said at least one measurement variable measured and/or monitored by said field device, or said field device comprises monitoring means, diagnosing means, verification means or calibration means allowing for the performance of the field device and/or of one or more components thereof to be monitored during operation based on measured values of a predefined variable determined by said monitoring means, diagnosing means, verification means or calibration means, wherein said predefined variable corresponds to said monitored variable.

BRIEF DESCRIPTION OF THE DRAWINGS

The present disclosure and further advantages are explained in more detail using the figures of the drawing.

DETAILED DESCRIPTION

Figure 1:
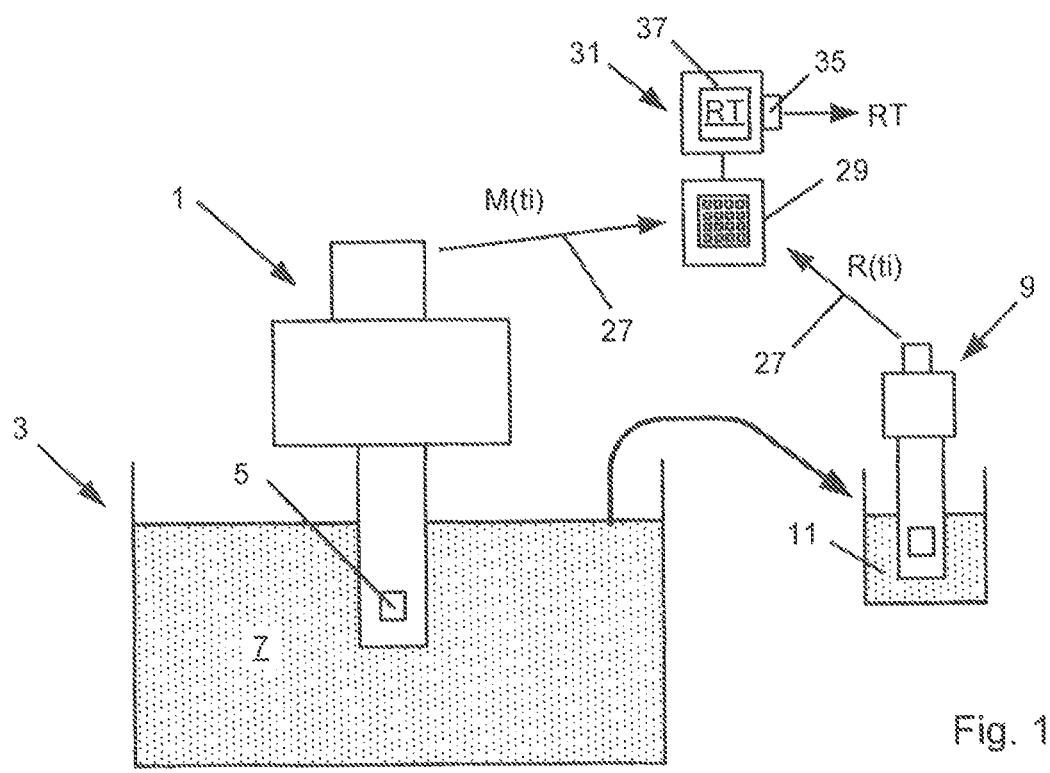
FIG. 1 shows an example of a field device operating at an operating site.

The present disclosure concerns a method of operating a field device 1 for measuring and/or monitoring at least one measurement variable p at an operating site 3 and of predictive monitoring of a compliancy of at least one characteristic of said field device 1 to a requirement specified for said field device 1. The method according to the present disclosure can e.g. be applied to any of the field devices mentioned above.

According to the present disclosure, the characteristic is continuously monitored by at consecutive times ti determining and recording a deviation $D(t_i)$ between a measured value $M(t_i)$ of a monitored variable m determined by the field device 1 and a corresponding reference value $R(t_i)$ of the monitored variable m, wherein the deviations $D(t_i)$ are indicative of a degree of compliancy of the field device 1 to the requirement. Herein, the deviations $D(t_i)$ are considered to be indicative of the degree of compliancy in case the requirement can be translated into a deviation range DR for the deviation $D(t)$, such that the field device 1 will be considered non-compliant to the requirement in case the deviation $D(t)$ exceeds the deviation range DR. As an example, the deviations $D(t_i)$ can e.g. each be determined as a difference between the measured value $M(t_i)$ and the corresponding reference value $R(t_i)$. In that case, the deviation range DR comprises an upper and a lower deviation limit DL+, DL−, not to be exceeded during operation of the field device 1 at the operating site 3. As an alternative, the deviations $D(t_i)$ can e.g. be determined as positive absolute values of the differences. In that case the deviation range DR comprises a maximum permissible deviation MPD, not to be exceeded.

The monitored variable m is preferably chosen based on the requirement specified for the field device 1 under consideration, the functions and capabilities of the field device 1, as well as based on the availability of the measured values $M(t_i)$ and corresponding the refence values $R(t_i)$.

As an example, each of the measurement variables p determined by the field device 1 can be applied as monitored variable m. In this case, the deviations $D(t_i)$ corresponds to the measurement error of the field device 1, which is indicative of the degree of compliancy to a measurement accuracy specified for the field device 1. With respect to field devices 1 comprising means, e.g. monitoring means, diagnosing means, verification means or calibration means, allowing for the performance of the entire field device 1 and/or of one or more components thereof to be monitored during operation based on measured values of a predefined variable determined by these means and corresponding reference values, these predefined variables can be used as monitored variables m in the method described herein.

The monitored variable m can e.g. be determined by the field device 1 based on one or several input variables determined or provided by the field device 1 and/or based on one or more input parameters determined or provided by the field device 1. In this respect, the monitored variable m can e.g. be determined as a function of at least one input variable and/or at least one input parameter, which is indicative of a certain property of the field device 1.

Regardless of the choice of monitored variable m the corresponding reference values $R(t_i)$ can either be provided by the field device 1 itself or by other means. In the first case the reference values $R(t_i)$ can e.g. be given by target values stored in the field device 1 or they can be measured or determined by means comprised in the field device 1. In the latter case, the other means can e.g. comprise an additional device, that can either be permanently installed at the operation site 3, e.g. a redundant measurement device measuring the monitored variable m, or that can be operated in parallel to the field device 1 intermittently at consecutive times ti. As an example, reference values R(ti) for a flow measured by a flow meter installed on a pipe can e.g. be provided by an additional permanently installed flow meter or by an ultrasonic clamp on flow meter solely clamped onto the pipe at the consecutive times ti.

FIG. 1 shows another example, wherein the field device 1 comprises a sensor 5 continuously measuring a measured variable p of a medium 7 located at the operation site 3, e.g. a pH-value or a concentration of an analyte comprised in the medium 7. In this example, the monitored variable m is equal to the measured variable p, and the reference values R(ti) are provided at consecutive times ti by reference measurements performed by another measurement device 9 on samples 11 of the medium 7 taken at the consecutive times ti.

Figure 2:
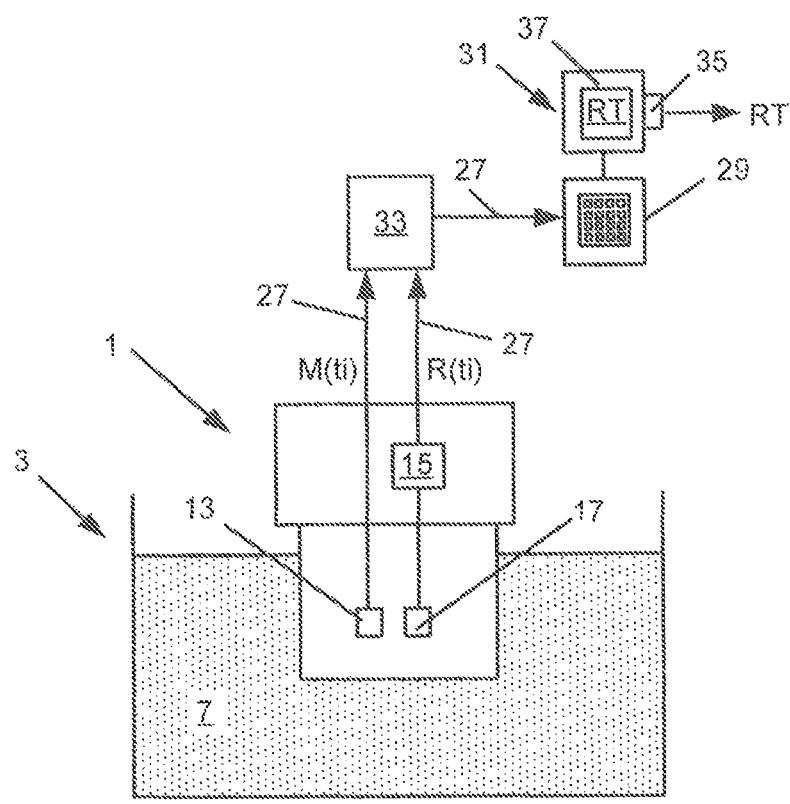
FIG. 2 shows a field device comprising means providing reference values for a measurement variable.

FIG. 2 shows another example, wherein the field device 1 comprises a temperature sensor 13 continuously measuring a temperature and means 15 detecting phase transitions of a material 17 located near the temperature sensor 13 and exhibiting a phase transition at a known transition temperature, as e.g. described in DE 10 2016 123 856 A1. Here the transition temperature constitutes a reference value R(ti) for the temperature measured by the field device 1, which is provided by the means 15 at the consecutive times ti at which the phase transitions occur.

Figure 3:
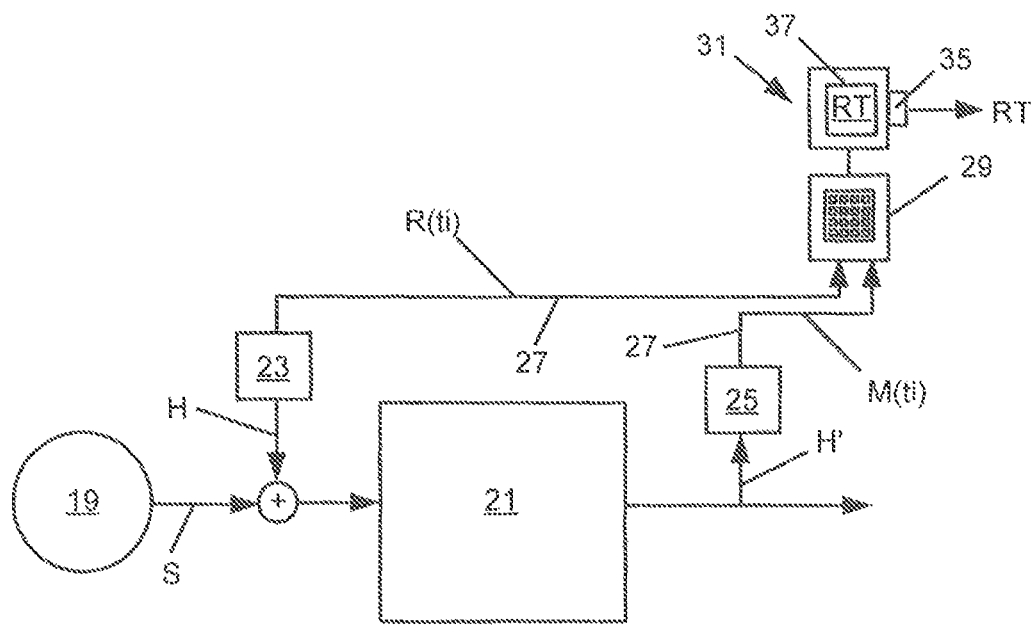
FIG. 3 shows a field device comprising means providing reference values for a monitored variable.

FIG. 3 shows another example, wherein the field device 1 comprises a sensor 19 and a measurement electronic 21 processing a primary signal S generated by the sensor 19. This field device 1 comprises means 23 for superimposing a test signal H onto the primary signal S and means 25 for determining a property, like for example a frequency f or an amplitude A, of the processed test signal H' available at the output of the measurement electronic 21. Here the property of the processed test signal H' constitutes the monitored variable m available every time a test signal H is superimposed and the corresponding reference values R(ti) are given by the values of the property to be expected during proper operation of the measurement electronic 21 based on the test signal H applied. In this example, the deviations D(ti) are not only indicative of the performance of the measurement electronic 19, but also of other characteristics of the field device 1, like e.g. the measurement accuracy, affected by the performance of the measurement electronic 21.

Figure 4:
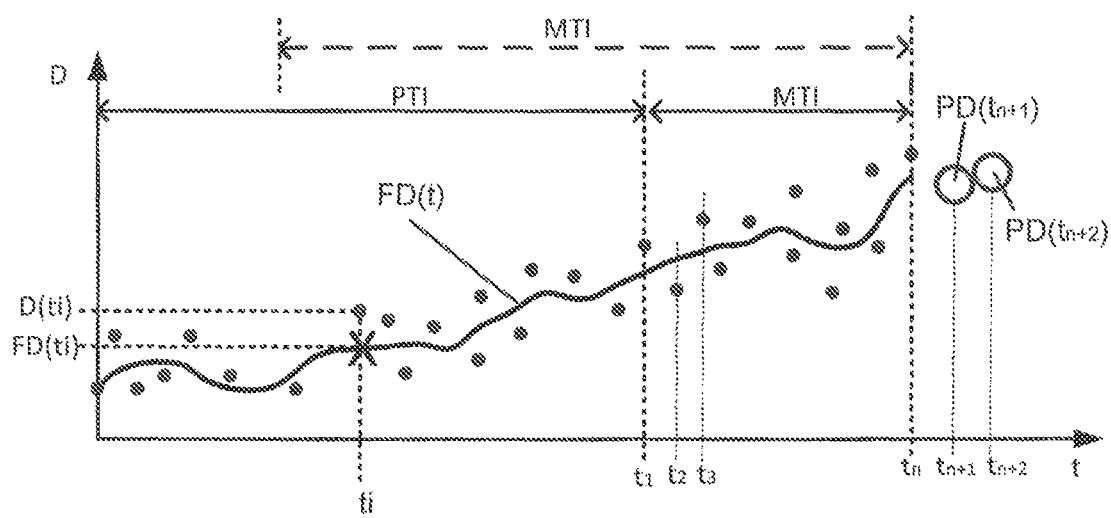
FIG. 4 shows deviations recorded over a time range comprising a preliminary time interval and a monitoring time interval, corresponding filtered deviations and predicted deviations.

Regardless of the type of monitored variable m applied, the deviations D(ti) between the measured value M(ti) of the monitored variable m determined by the field device 1 and the corresponding reference value R(ti) are preferably determined for each of the consecutive times ti, at which or for which both the measured value M(ti) and the reference value R(ti) are available. In addition, the thus determined deviations D(ti) and the corresponding times ti are recorded. FIG. 4 shows an example of recorded deviations D(ti), indicated by dots, recorded over a time range comprising a preliminary time interval PTI and a monitoring time interval MTI following the preliminary time interval PTI.

Further, the recorded deviations D(ti) are filtered by applying a filter to the recorded deviations D(ti). In the context of the method described herein, the filter can be any means or method capable of separating the signal comprised in the recorded deviations D(ti) from a noise superimposed on the signal. As an example a smoothing filter or a Kalman filter can be used. The filtered deviations FD(ti) thus determined for each of the times ti corresponding to the times ti of the recorded deviations D(ti) can either be determined as individual values as exemplary indicated by a cross x in FIG. 4 or based on a function FD(t) of time t, also shown in FIG. 4.

In a next step, the noise N superimposed on the filtered deviations FD(ti) is determined based on the recorded deviations D(ti) and the filtered deviations FD(ti). This noise N is preferably determined a as probability distribution PDF($\Delta$) representing the noise N. This probability distribution PDF($\Delta$) can for example be determined based on or as a frequency distribution of the differences $\Delta i = D(ti) - FD(ti)$ between the recorded deviations D(ti) and the corresponding filtered deviations FD(ti). Alternatively the probability distribution PDF($\Delta$) can be determined based on a given type of distribution, like e.g. a Gaussian distribution, by fitting at least one parameter of the distribution to a corresponding property of the noise N determined based on the recorded deviations D(ti) and the corresponding filtered deviations FD(ti). As an example, an average of the differences $\Delta i := D(ti) - FD(ti)$ can be applied as a characteristic property of the noise N to perform the fitting.

In order for the noise N to truly reflect the uncertainty inherent to the determination of the deviations D(ti), the noise N is preferably determined based on a sufficiently high number of deviations D(ti), e.g. a number larger or equal to 10, preferably larger or equal to 30, of recorded deviations D(ti) and corresponding filtered deviations FD(ti). The noise N can e.g. be determined based on recorded deviations D(ti) and corresponding filtered deviations FD(ti) comprised in a preliminary time interval PTI, during which a correspondingly high number of deviations D(ti), have been recorded.

Once the noise N has been determined, a remaining time RT until the initially compliant field device 1 will no longer be compliant to the requirement can be determined. The remaining time RT corresponds to the time remaining until the deviations D(t) will exceed the deviation range DR. The remaining time RT can be determined as a remaining time interval RTI given by the amount of time remaining until the deviations D(ti) will exceed the deviation range DR and/or as a point in time tRT at which the deviations D(t) will exceed the deviation range DR.

Figure 5:
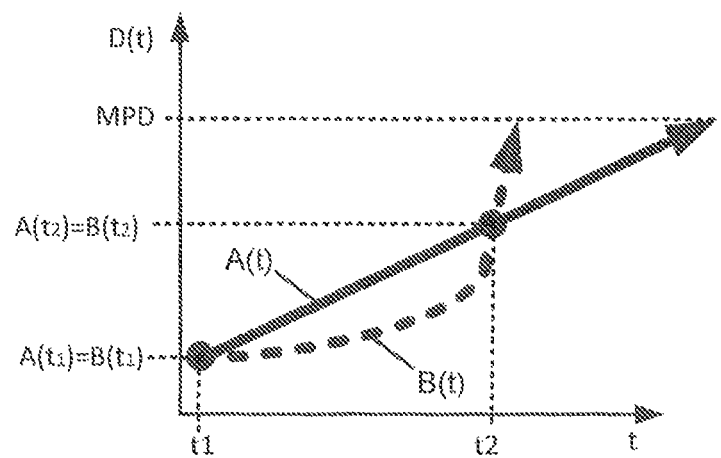
FIG. 5 shows examples of deviations exhibiting different time dependencies.

The remaining time RT depends on the time dependency of the deviations D(t). This is demonstrated in FIG. 5 showing an example of a maximal permissible deviation MPD together with deviations A(t) comprising a linear time dependency and deviations B(t) comprising a non-linearly increasing time dependency. In this example both deviations A(t), B(t) exhibit identical deviation values A(t1)=B(t1), A(t2)=B(t2) at a first time t1 and at a second time t2. Despite this, the future development of these deviations A(t), B(t) can be expected to be very different as indicated by arrows. There is a large variety of applications, wherein the time dependency of the deviations D(t) cannot be determined with a sufficient degree of accuracy and/or wherein the time dependency may change significantly during the life time of the field device 1 in an unpredictable manner, e.g. due to unexpected and/or unpredictable changes of the performance capabilities of the field device 1 and/or due to unexpected and/or unpredictable changes of environmental or other conditions the field device 1 is exposed to.

This problem is overcome by the method according to the present disclosure by performing the determination of the remaining time RT at the end of at least one monitoring time interval MTI, during which three or more deviations D(ti)

have been recorded and wherein none of the deviations D(ti) recorded during the monitoring time interval MTI exceeded the deviation range DR. Each determination of the remaining time RT comprises a step of for at least two different deviation pairs k, each comprising a first and a second deviation $D1k(t1k)$, $D2k(t2k)$ determined based on the filtered deviations FD(ti) comprised in the monitoring time interval (MTI), determining a simulated value SRTk of the remaining time RT by performing a Monte Carlo simulation based on the noise N and the respective deviation pair k. Following this, the remaining time RT is determined based on all previously determined simulated values SRTk and an output informing about the remaining time RT is generated.

The present disclosure further comprises a system for performing the method according to the present disclosure, comprising:

a) the field device 1 comprising means for determining the measured values M(ti) of the monitored variable m, b) means providing the reference values R(ti) of the monitored variable m, c) data transfer means 27 providing the recorded deviations D(ti) or the measured values M(ti) and the reference values R(ti) to computing means 29 comprised in the system and designed to perform a computer program implemented on said computing means 29 causing the computing means 29 to perform the determination of the noise N and of the at least one remaining time RT, and d) output means 31 providing the output generated by the performance of the method.

The computing means 29 can be located in the field device 1, at the operation site 3 or at a remote location. Alternatively, cloud computing can be applied. The data transfer means 27 preferably comprise hard wired and/or wireless transmission lines. To this extent, data bus communication systems applied in process automation, like e.g. Fieldbus, wired or wireless local area networks LAN, WLAN and/or short range wireless communication means, such as Bluetooth or Near Field Communication (NFC), can be applied. The data transferred to and from the computing means 29 can e.g. either be transferred directly and/or continuously, as e.g. shown in FIG. 1, or via a buffer 33 collecting and transmitting batches of data, as e.g. shown in FIG. 2. The output means 31 preferably comprise a signal output 35 providing an output signal representing the output generated by the method and/or a display 37 displaying the output.

In the following exemplary embodiments of individual steps of the method are described. These embodiments constitute optional features, that can be applied individually or in combination. Alternative embodiments suitable to perform the respective method step can be applied without deviating from the scope of the present disclosure.

As described above, the remaining time RT is determined at least once and each determination of the remaining time RT is performed at the end of a monitoring time interval MTI. In case the remaining time RT is determined more than once, the monitoring time intervals MTI may comprise consecutive intervals, overlapping time intervals, at least one interval of a fixed length and/or at least one interval of individually determined length. Monitoring time intervals MTI of a fixed length are preferably applied in applications, wherein the measured values M(ti) and the corresponding reference values R(ti) are available at fairly constant rate or frequency. In this case the fixed length is preferably longer than a time required for at least three consecutive deviations D(ti) to be recorded and of the same order of magnitude as a timescale on which the deviations D(ti) may exceed the deviation range DR. Monitoring time intervals MTI of individually determined lengths are preferably applied in applications, wherein the time differences between consecutive times ti at which or for which the deviations D(ti) are available is unknown and/or may vary significantly. In this case the end of each monitoring time interval MTI is preferably determined to be equal to the time at which a predefined number n of deviations D(ti) larger or equal to three has been recorded after the beginning of the respective monitoring time MTI. In this case the beginning of each subsequent monitoring time interval MTI is preferably determined as a point in time after the beginning of the previous monitoring time MTI and before or at the end of the previous monitoring time interval MTI. This leads to individually determined monitoring time intervals MTI, wherein the length of each interval is determined based on the present rate of availability of the deviations D(ti).

As shown in FIG. 4, the noise N can be determined based on the deviations D(ti) recorded during a preliminary time interval PTI. In this case the beginning of the first monitoring time MTI can be a point in time at or after the end of the preliminary time interval PTI. As an alternative, the length of at least one of the monitoring time intervals MTI can be determined to be longer or equal to the time required for a number of consecutive deviations D(ti) sufficient to determine the noise N to be recorded. One example of this alternative length of the monitoring time interval MTI is indicated by a dotted double arrow shown in FIG. 4. In this case, the noise N, as well as the remaining time RT can be determined as described above based on the deviations D(ti) recorded during each of these correspondingly long monitoring time intervals MTI.

The determination of the remaining time RT requires for the field device 1 to be compliant to the requirement during the preceding monitoring interval MTI. This is preferably ensured by monitoring, whether any of the determined deviations D(ti) exceeded the deviation range DR. As an optional feature, safety of operating the field device 1 can be further enhanced by generating an alarm when at least one of the recorded deviations D(ti) exceeded the deviation range DR. These alarms are preferably issued by the output means 29. Once an alarm has been generated a service action, e.g. a calibration, an adjustment, a repair and/or a maintenance procedure, is performed on the field device 1.

Following a service action, the method according to the present disclosure is preferably resumed by determining at least one more remaining time RT based on the previously determined noise N or restarted from the beginning. Restarting the method from the beginning has the advantage, that the noise N will be newly determined. This has the advantage, that changes of the uncertainty inherent to the determination of the measured values M(ti) and/or the reference values R(ti) that may have been caused by the service action, will be accounted for.

With respect to the Monte Carlo simulations performed to determine the simulated times SRTk, simulation methods known in the art can be applied.

Figure 6:
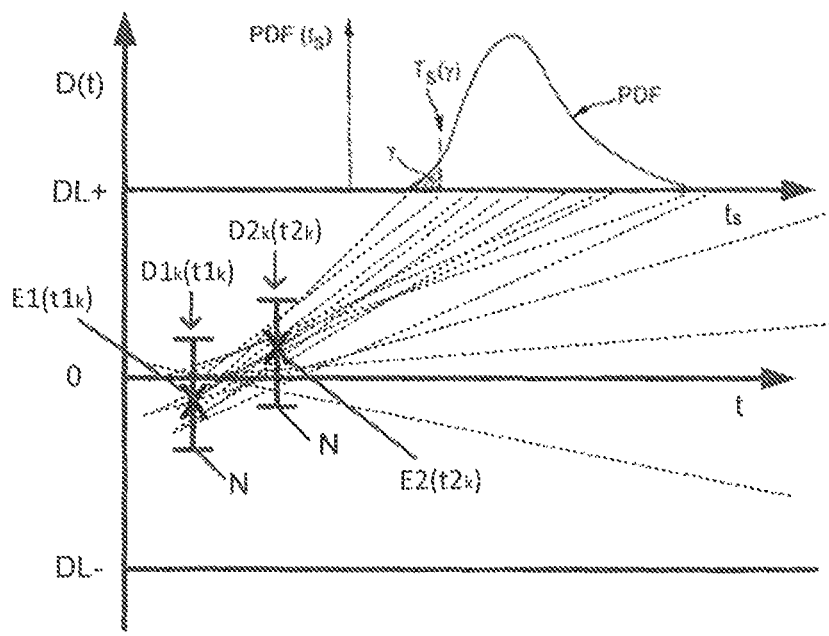
FIG. 6 shows a Monte Carlo simulation determining a simulated remaining time.

FIG. 6 shows an example of a preferred simulation method performed based on one of the deviation pairs k. It comprises a first step of based on the noise N, indicated by bars, the first and the second deviation $D1k(t1k)$, $D2k(t2k)$ and the corresponding times $t1k$, $t2k$ of this deviation pair k generating a statistically representative number of pairs of first and second random deviations $[E1(t1k):=D1k(t1k)+e1; E2(t2k):=D2k(t2k)+e2]$, wherein each random deviation E1, E2 is equal to a sum of the respective deviation $D1k(t1k)$, $D2k(t2k)$ of the pair k and a random additive e1, e2 accounting for the noise N. In this respect, the random additives e1, e2 are preferably generated according to a probability distribution reflecting the properties of the noise N, e.g. the probability density function PDF(Δ) described above.

For each pair of random deviations [E1(t1k); E2(t2k)] a crossing time tS is determined as the time at which a straight line passing through the first random deviation E1(t1k) at the first time t1k and through the second random deviation E2(t2k) at the second time t2k will exceed the deviation range DR. Some examples of the thus determined straight lines are shown as dotted lines in FIG. 6 together with the deviation range DR, represented by the upper and the lower deviation limit DL+, DL− shown in FIG. 6. Based on the crossing times tS a probability density function PDF(tS) of the crossing times tS is determined and the simulated value SRTk is determined based on the probability density function PDF(tS) of the crossing times tS. To this extent, a confidence level γ can be set and the simulated value SRTk can be determined to be equal to the time TS(γ) predicted based on the probability density function PDF(tS) at which the deviations D(ti) will exceed the deviation range DR with the given confidence level γ by solving the following equation for TS(γ):

$$\int_{-\infty}^{T_S(\gamma)} PDF(t_S) dt_S = \gamma$$

The confidence level is preferably set based on the severity of the consequences involved, should the field device 1 become non-compliant during operation at the operating site 3.

As mentioned above, the first and the second deviation D1k(t1k), D2k(t2k) of each deviation pair k are determined based on the filtered deviations FD(ti) comprised in the monitoring time interval MTI. This has the advantage, that the influence of outliers or erroneous values of individual recorded deviations D(ti) on the determination of the remaining time RT is minimized.

The first deviation D1k(t1k) of each deviation pair k is preferably given by one of the filtered deviations FD(t1k) comprised in the monitoring time interval MTI. The second deviation D2k(t2k) of each pair k is preferably either given by another filtered deviation FD(ti) comprised in the monitoring time interval MTI or given by a predicted deviation PD(t2k), forecasted for a corresponding time t2k after the end of the monitoring time interval MTI. Examples of predicted deviations PD(tn+1), PD(tn+2) forecasted for the corresponding times tn+1, tn+2 after the end of the monitoring time interval MTI are indicated by circles in FIG. 4. The predicted deviations PD(t2k) are preferably determined based on the filtered deviations FD(ti) comprised in the monitoring time interval MTI. They can for example be determined by applying mathematical forecasting methods, like e.g. time series forecasting. Alternatively, machine learning, deep learning or neural networks can be applied to forecast at least one predicted deviation PD(t2k).

Predicted deviations PD(ti) forecasted for corresponding times ti in the very near future are very reliable. The reliability of the forecasts does however decrease as the time difference between the corresponding time ti and the end of the monitoring time interval MTI increases. Thus, the use of predicted deviations PD(ti) is preferably limited to predictions made for corresponding times ti, which exceed the end of the monitoring interval MTI by less than a small fraction of the length of the monitoring time interval MTI, e.g. by less than one fifth, preferably by less than one tenth of the length of the monitoring time interval MTI.

The use of at least one of these predicted deviations PD(ti) has the advantage, that they not only provide reliable information extending into the future, but also provide a more accurate representation of the time dependency of the deviations near the end of the monitoring time interval MTI than the filtered deviations FD(ti) occurring at or very near the end of the monitoring time interval MTI.

There are different ways of determining the set of different deviation pairs k for which the simulated values SRTk are determined. One approach is for the set to comprise all or at least a large fraction of all the different deviation pairs k available based on either the filtered deviations FD(ti) comprised in the monitoring time interval MTI or the filtered deviations FD(ti) comprised in the monitoring time interval MTI and the predicted deviations PD(ti). This brute force approach renders reasonably good results. It does however require a large amount of computing power. Preferably, the set solely comprises a limited selection of all the different deviation pairs k available. Even though the different deviation pairs k can be randomly selected, the selection is preferably optimized to enhance the capability of the method to account for the time dependency of the recorded deviations D(ti) based on the limited number of pairs k comprised in the set.

Figure 7:
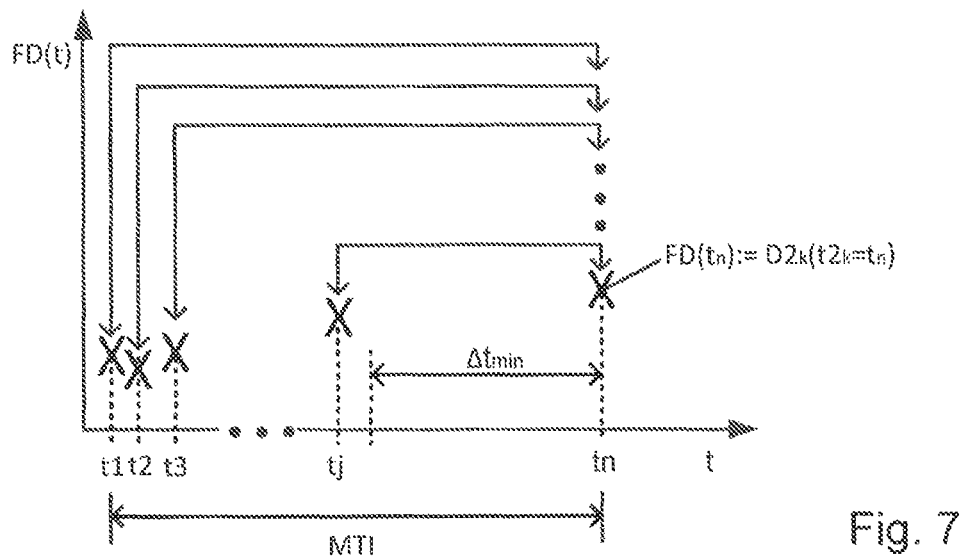
FIGS. 7 to 9 each show an example of a set of deviation pairs.

FIG. 7 shows an example of n filtered deviations FD(t1), FD(tn) comprised in the monitoring time interval MTI, wherein the set of deviation pairs k, indicated by double arrows, is selected such, that the second deviation D2k(t2k) of each pair k is given by the last filtered deviation FD(tn) or one of the last filtered deviation FD(ti) comprised in the monitoring time interval MTI.

Figure 8:
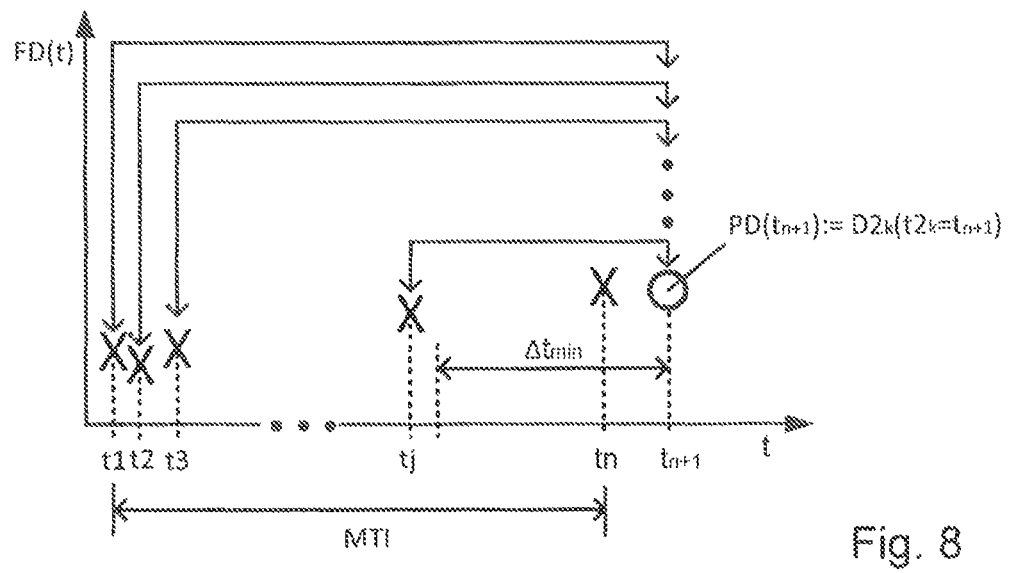

FIG. 8 shows another example of n filtered deviations FD(t1), FD(tn) comprised in the monitoring time interval MTI, wherein the set of pairs k, indicated by double arrows, is selected such, that the second deviation D2k(t2k) of each pair k is given by one of the predicted deviations PD(t2k) or the same predicted deviation PD(t2k) forecasted for the corresponding time t2k after the end of the monitoring time interval MTI.

As an option, the selection methods shown in FIGS. 7 and 8 can be further improved by only selecting deviation pairs k, wherein the time difference t2k-t1k between the times t2k, t1k corresponding to the first and the second deviation D1k(t1k), D2k(t2k) is larger or equal to a predetermined minimal time difference Δtmin. This way, the influence of short term fluctuations of the filtered deviations FD(t) occurring shortly before or at the end of the monitoring time interval MTI, which do not represent the true time dependency of the deviations D(t) in this time range, on the determination of the remaining time RT is reduced. This option makes the determination of the remaining time RT more robust and stable. It does however reduce the capability of the method to account for sudden changes of the time dependency of the deviations D(ti) occurring in a time interval of the length of the minimal time difference Δtmin preceding the time t2k corresponding to the second deviation D2k(t2k). In this respect, applying the predicted deviation PD(t2k) as the second deviation D2k(t2k) of each deviation pair k has the advantage, that only part of this time interval extends into the monitoring time interval MTI. Thus, the use of the predicted deviations PD(t2k) improves the capability of the method to account for sudden changes of the time dependency of the deviations D(t) occurring shortly before or at the end of the monitoring time interval MTI.

Figure 9:
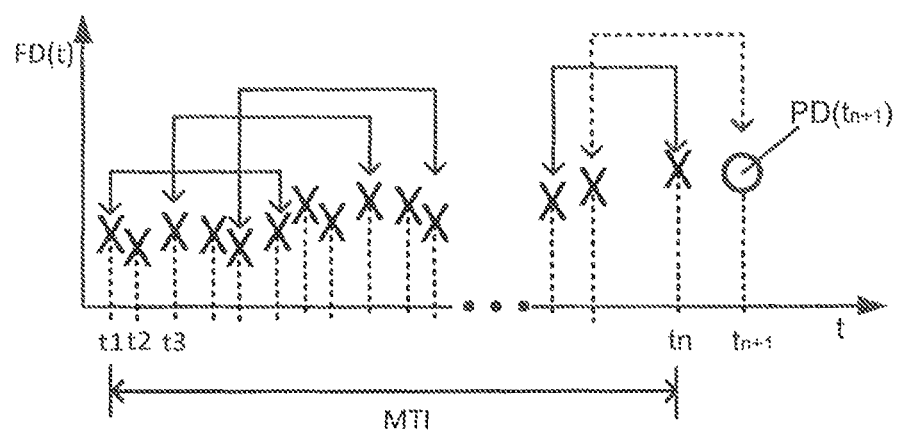

FIG. 9 shows another example wherein the set of deviation pairs k, indicated by double arrows, is selected such, the first deviation D1k(t1k) of the first deviation pair k of the set is located at or near the beginning of the monitoring time interval MTI. Starting with the second deviation pair k of the set, the first deviation D1k(t1k) of each of these deviation pairs k is selected such, that the corresponding time t1k is larger than the corresponding time t1k of the first deviation D1k(t1k) of the previous deviation pair k and the second deviation D2k(t2k) of each pair k is selected such, that the corresponding time t2k is larger than the corresponding time t2k of the second deviation D2k(t2k) of the previous deviation pair k. In consequence, the times elapsed between the first and second deviations D1k(t1k), D2k(t2k) of the consecutive deviation pairs k of the set form a sliding time window of fixed or variable length sliding along the monitoring time interval MTI. In this embodiment, the deviation pairs k are preferably determined such, that the section [t1k, t2k] of the monitoring time interval MTI enclosed between the two times t1k, t2k corresponding to the first and the second deviation D1k(t1k), D2k(t2k) of each pair k comprises two or more recorded deviations D(ti), wherein t1k<ti<t2k. Just like in the previously described embodiments the first deviations D1k(t1k) of all deviation pairs k are each given by one of the filtered deviations FD(t1k), comprised in the monitoring time interval MTI and second deviations D2k(t2k) of the deviation pairs k are either each given by one of the filtered deviations FD(t2k) comprised in the monitoring time interval MTI or comprise at least one second deviation D2k(t2k) given by a predicted deviation PD(t2k).

Regardless of the determination of the deviation pairs k, each remaining time RT is determined based on the simulated values SRTk determined for each deviation pair k, e.g. as an average or a weighted average of the simulated values SRTk. In case of a weighted average, the weighing factors applied to the simulated values SRTk are preferably determined based on the times t1k, t2k corresponding to the first and the second deviation D1k(t1k), D2k(t2k) of the respective deviation pair k, e.g. by $$RT = \frac{\sum_{k=1}^{L}(t2_k - t1_k)*SRT_k}{\sum_{k=1}^{L}(t2_k - t1_k)}$$

Once the remaining time RT has been determined as described above, the corresponding output generated by the method according to the present disclosure is preferably applied by scheduling and/or performing at least one service action, e.g. a calibration and/or a maintenance procedure, on the field device 1 before the point in time tRT given by the remaining time RT, at which the deviations D(ti) will exceed the deviation range DR. Following any of these service action, the method according to the present disclosure is preferably resumed based on the previously determined noise N or restarted form the beginning as described above.

Optionally, the method according to the present disclosure can be further improved by following the determination of at least one remaining time RT determining at least one more remaining time RT as described above before the point in time tRT at which the deviations D(ti) will exceed the deviation range DR according to the previously determined remaining time RT. In this case the output informing about the remaining time RT is preferably updated accordingly every time a new remaining time RT has been determined. Also scheduling and/or performance of the service actions is preferably performed based on the most recently determined remaining time RT. Again, following any of these service action, the method according to the present disclosure is preferably resumed based on the previously determined noise N or restarted form the beginning as described above. Even though the consecutive determination of two or more remaining times RT is not mandatory, it enhances the capability of the method to detect and account for more sudden changes of the characteristic of the field device 1, e.g. changes due to unexpected wear and tear of the field device 1 and/or due to changes of environment and/or operating conditions the field device 1 is exposed to.

In general, it is sufficient to determine each of the consecutively determined remaining times RT based on the noise N initially determined based on the deviations D(ti) recorded during the preliminary time interval PTI or the first monitoring time interval MTI comprising a sufficiently high number of recorded deviations D(ti). Optionally, the method according to the present disclosure can be further improved by at least once re-determining the noise N as described above based on more recently recorded deviations D(ti) and the corresponding filtered deviations FD(ti). Just like the first determination of the noise N, any re-determination of the noise N is preferably performed based on a sufficiently large number of more recently recorded deviations D(ti) and the corresponding filtered deviations FD(ti).

As an alternative or in addition to this tests can be performed based on recently recorded deviations D(ti) testing whether the noise N has changed significantly since it has last been determined. To this extent test methods used in statistical data analysis, like e.g. hypothesis-testing, e.g. based on Chi-Square tests, can be applied. Based on these tests changes of the noise N can be detected with a fairly high level of confidence based on a number of recently recorded deviations D(ti) and the corresponding filtered deviations FD(ti), which is smaller than the number of recorded and filtered deviations D(ti), FD(ti) required to re-determine the noise N with a correspondingly high level of accuracy. In this case, the noise N is preferably only re-determined in case a significant change of the noise N has been determined based on the tests.

As another option, the noise N can be continuously updated, based on the deviations D(ti) recorded after the first determination of the noise N and the corresponding filtered deviations FD(ti).

As another alternative, monitoring time intervals MTI comprising at least ten, preferably at least thirty recorded deviations D(ti) can be applied. In this case, the noise N and the remaining time RT can both be determined at the end of each of these monitoring time intervals MTI based on the recorded deviations D(ti) comprised therein. This has the advantage, that the recorded deviations D(ti) and corresponding times ti obtained during individual monitoring time intervals MTI can be transmitted to the computing means 29 as individual data batches, that can be deleted after the noise N and the remaining time RT have been determined.

The invention claimed is:

1. A method of operating a field device, including measuring or monitoring at least one measurement variable at an operating site and of predictive monitoring of a compliancy of at least one characteristic of the field device to a requirement specified for the field device, the method including steps of:

continuously monitoring the characteristic by: at consecutive times determining a deviation between a measured value of a monitored variable determined by the field device and a reference value of the monitored variable, wherein the deviations are indicative of a degree of compliancy to said requirement, recording the deviations, applying a filter to the recorded deviations, based on the deviations and the filtered deviations determining a noise superimposed on the filtered deviations, at the end of at least one monitoring time interval, during which three or more deviations have been recorded and wherein none of these deviations exceeded a deviation range defined for the deviations based on the requirement, determining a remaining time remaining until the deviations will exceed said deviation range, by:

for at least two different deviation pairs, each comprising a first and a second deviation determined based on the filtered deviations comprised in the monitoring time interval, determining a simulated value of the remaining time by performing a Monte Carlo simulation based on the noise and the respective deviation pair, based on the simulated values determining the remaining time, and generating an output informing about the remaining time.

2. The method of claim 1, wherein:

the first deviation of each deviation pair is given by one of the filtered deviations comprised in the monitoring time interval, and the second deviation of each pair is either given by another filtered deviation comprised in the monitoring time interval or given by a predicted deviation forecasted for a time after the end of the monitoring time interval based on the filtered deviations comprised in the monitoring time interval.

3. The method of claim 2, wherein:

each predicted deviation is forecasted for the corresponding time exceeding an end of the monitoring interval by less than a fraction of the length of the monitoring time interval, by less than one fifth of the length of the monitoring time interval or by less than one tenth of the length of the monitoring time interval, or each predicted deviation is determined based on the filtered deviations comprised in the monitoring time interval by a method of time series forecasting, by applying machine learning or deep learning, or by applying a neural network.

4. The method of claim 2, wherein at least one determination of the remaining time is performed based on simulated values of the remaining time determined for a set of different deviation pairs, wherein said set of different deviation pairs:

is selected such, that the second deviation of each deviation pair is given by the last filtered deviation or one of the last filtered deviations comprised in the monitoring time interval; or is selected such, that the second deviation of each deviation pair is given by one of the predicted deviations or the same predicted deviation.

5. The method of claim 4, wherein a time difference between the times corresponding to the first and the second deviation of each of the deviation pairs comprised in the set is larger or equal to a predetermined minimal time difference.

6. The method of claim 5, wherein at least one determination of the remaining time is performed based on simulated values of the remaining time determined for a set of different deviation pairs, wherein said set of different deviation pairs is selected such that:

the first deviation of the first deviation pair of the set is located at or near the beginning of the monitoring time interval, starting with the second deviation pair of the set, the first deviation of each deviation pair is selected such that the corresponding time is larger than the corresponding time of the first deviation of the previous deviation pair and the second deviation of each deviation pair is selected such, that the corresponding time is larger than the corresponding time of the second deviation of the previous deviation pair, and a section of the monitoring time interval enclosed between the times corresponding to the first and the second deviation of each pair comprises two or more recorded deviations.

7. The method of claim 1, wherein:

said filter applied to determine the filtered deviations is capable of separating a signal comprised in the recorded deviations from a noise superimposed on this signal, each remaining time is determined as a remaining time interval given by the amount of time remaining until the deviations will exceed the deviation range or as a point in time at which the deviations will exceed the deviation range, each remaining time is determined as an average or a weighted average of the simulated values of the remaining time determined for each of the deviations pairs, the monitored variable is:

one of the at least one measured variables measured or monitored by said field device;

a predefined variable determined by monitoring, diagnosing, verification, or calibration comprised in the field device, or is determined by the field device based on one or several input variables determined or provided by the field device or based on one or more input parameters determined or provided by the field device; or said reference values are:

provided by the field device, by monitoring, diagnosing, verification, or calibration comprised in the field device, or by another device; or given by target values stored in the field device or measured or determined by the field device.

8. The method of claim 1, wherein:

at least one remaining time is determined as a weighted average of the simulated values of the remaining time determined for each of the deviations pairs, wherein each weighing factor applied to determine the weighted average is determined based on the times corresponding to the first and the second deviation of the respective deviation pair; or at least one remaining time is determined based on the formula:

$$RT = \frac{\sum_{k=1}^{L}(t2_k - t1_k) * SRT_k}{\sum_{k=1}^{L}(t2_k - t1_k)}$$

wherein RT denominates the remaining time (RT), k denominates the respective pair (k), and $t1_k$ and $t2_k$ denominate the times $(t1_k, t2_k)$ corresponding to the first and the second deviation of the respective pair (k).

9. The method of claim 1, wherein the noise:
is determined based on the deviations recorded during a preliminary time interval preceding the first determination of the remaining time and the corresponding filtered deviations, wherein at least ten or at least thirty deviations have been recorded during said preliminary time interval;
is determined or re-determined based on the deviations recorded during one of the at least one monitoring time intervals and the corresponding filtered deviations at least once or at the end of each monitoring time interval, wherein at least ten or at least thirty deviations have been recorded during each of said monitoring time intervals;
is determined as probability distribution representing the noise; or
is determined as probability distribution, wherein said probability distribution is either determined based on or as a frequency distribution of the differences between the recorded deviations and the corresponding filtered deviations or by fitting at least one parameter of a distribution of a given type to a corresponding property of the noise determined based on the recorded deviations and the corresponding filtered deviations.

10. The method of claim 9, comprising at least one of the steps of:
at least once re-determining the noise based on more recently recorded deviations and the corresponding filtered deviations,
based on deviations recorded after the most recent determination of the noise performing a test testing whether the noise has changed significantly since it has last been determined and re-determining the noise in case a significant change of the noise has been determined based on the tests, or
continuously updating the noise based on the deviations recorded after the determination of the noise.

11. The method of claim 1, further comprising the steps of:
monitoring whether any of the determined deviations exceed the deviation range, and
generating an alarm when at least one of the recorded deviations exceeded the deviation range or performing a service action on the field device when at least one of the recorded deviations exceeded the deviation range.

12. The method of claim 1, further comprising at least one of the steps of:
based on at least one determined remaining time scheduling at least one service action to be performed on the field device,
performing at least one service action on the field device before a point in time, at which the deviations will exceed the deviation range according to the last determined remaining time,
following the performance of a service action on the field device resuming the method by determining at least one more remaining time based on the previously determined noise or by restarting the method from the beginning,
following the determination of at least one remaining time determining at least one more remaining time before the point in time at which the deviations will exceed the deviation range according to the previously determined remaining time, and
updating the output informing about the remaining time every time a new remaining time has been determined.

13. The method of claim 1, wherein:
the monitoring time intervals comprise consecutive intervals, overlapping time intervals, at least one interval of a fixed length or at least one interval of an individually determined length,
at least one monitoring time interval is determined by determining the end of this monitoring time interval to be equal to a time at which a predefined number of deviations larger or equal to three has been recorded after a beginning of this monitoring time interval, or
the length of at least one monitoring time interval is determined as a fixed length longer than a time required for at least three consecutive deviations to be recorded and of the same order of magnitude as a timescale on which the deviations may exceed the deviation range.

14. A system for operating a field device, including measuring or monitoring at least one measurement variable at an operating site and of predictive monitoring of a compliancy of at least one characteristic of the field device to a requirement specified for the field device, the system configured for:
continuously monitoring the characteristic by: at consecutive times determining a deviation between a measured value of a monitored variable determined by the field device and a reference value of the monitored variable, wherein the deviations are indicative of a degree of compliancy to said requirement,
recording the deviations,
applying a filter to the recorded deviations,
based on the deviations and the filtered deviations determining a noise superimposed on the filtered deviations,
at the end of at least one monitoring time interval, during which three or more deviations have been recorded and wherein none of these deviations exceeded a deviation range defined for the deviations based on the requirement, determining a remaining time remaining until the deviations will exceed said deviation range, by:
for at least two different deviation pairs, each comprising a first and a second deviation determined based on the filtered deviations comprised in the monitoring time interval, determining a simulated value of the remaining time by performing a Monte Carlo simulation based on the noise and the respective deviation pair,
based on the simulated values determining the remaining time, and
generating an output informing about the remaining time.

* * * * *